United States Patent
Park et al.

Patent Number: 6,016,718
Date of Patent: Jan. 25, 2000

[54] HAND BRAKE WITH THE FOLDABLE OPERATING LEVER

[75] Inventors: Byung Chul Park, Junrabuk-do; Kyong Ro Lee, Daeku, both of Rep. of Korea

[73] Assignees: Hyundai Motor Company, Seoul, Rep. of Korea; Samlip Inc. Co., Ltd., Daedu, Rep. of Korea

[21] Appl. No.: 09/001,014

[22] Filed: Dec. 30, 1997

[30] Foreign Application Priority Data

Dec. 30, 1996 [KR] Rep. of Korea ............. 96-76633

[51] Int. Cl.[7] ............................................ B60T 7/08
[52] U.S. Cl. ............................ 74/538; 74/529; 74/535
[58] Field of Search .............................. 74/535, 538, 536, 74/537, 524, 529

[56] References Cited

U.S. PATENT DOCUMENTS 3,620,099  11/1971  Stotz ............................ 74/538 X

FOREIGN PATENT DOCUMENTS

| 457461 | 11/1991 | European Pat. Off. | 74/538 |
| 476208 | 3/1992 | European Pat. Off. | 74/535 |
| 480108 | 4/1992 | European Pat. Off. | 74/535 |
| 4126647 | 4/1992 | Japan | 74/535 |
| 4126648 | 4/1992 | Japan | 74/535 |
| 6056009 | 3/1994 | Japan | 74/535 |
| 6171481 | 6/1994 | Japan | 74/535 |

*Primary Examiner*—Mary Ann Battista

[57] ABSTRACT

A hand brake with a foldable operation lever comprises a ratchet fixed onto a car frame and an operating lever that can be moved up and down and coupled by a hinge onto the ratchet. It also comprises a push button, a rod coupled to the push button, and a slider coupled to the rod. The slider is located inside the operating lever and forcibly rotates a pawl. The pawl is coupled by a hinge to a rotational body, which allows the operating lever to be selectively locked and released from the ratchet. The operating lever also includes a lever limiter, which limits the rotation of the operating lever.

8 Claims, 2 Drawing Sheets

HAND BRAKE WITH THE FOLDABLE OPERATING LEVER

BACKGROUND OF THE INVENTION

1. Field of the Invention

The present invention relates to a hand brake with a foldable operating lever. When an automobile's hand brake of the present invention is engaged, the operating lever of the brake can be pulled down to a lowered position so that it is out of the way and thereby improve the aesthetics of a car's interior. Also under the present invention, a pawl, which is the device that limits the movement of the operating lever, is made to selectively separate with an operating element of the lever.

2. Discussion of Related Art

In general, an automobile has a hand brake, in addition to a foot brake, to generate a braking force. FIGS. 1 and 2 are provided to explain the mechanism related to regular hand brakes found in automobiles. As shown in FIG. 1, a regular hand brake includes a ratchet 100 in line with the length direction of the automobile's frame and an operating lever 200, which is hingedly coupled to the ratchet 100.

On the front of the ratchet 100, regularly spaced teeth 11 are formed. A pawl 230 is coupled to one end of a rod 22 which is operated by a push button 210 on the front side of the operating lever 200. The pawl 230 is set up such that it can be selectively in gear with the ratchet 100.

To apply a braking force, the operating lever 200 is moved upwards. The upward movement of the operating lever 200 causes a cable 30 to be pulled and thereby effectuating grasping of car's wheels. The pawl 230 goes in gear with the ratchet 100 to sustain the braking force.

To release the braking force, a push button 210 at the end of the operating lever 200 is pushed downwards. The movement of the push button causes the pawl 230 to be disengaged from the ratchet 100. The operating lever 200 then is lowered. The downward movement of the operating lever 200 relieves tension to the cable 30 and thereby releases the braking force from the automobile's wheels.

When this conventional automobile hand brake is engaged, the operating lever 200 remains in an upward position. This is aesthetically unappealing and is also inconvenient since it impedes movement within the automobile.

SUMMARY OF THE INVENTION

Accordingly, the present invention is directed to a hand brake that substantially obviates one or more of the problems due to the limitations and disadvantages of the related art.

An object of the present invention is to provide a hand brake with a foldable operating lever that improves the aesthetics while maintaining the brake force to the automobile.

Another object of the present invention is to provide a hand brake with a foldable operating lever that allows for freedom of movement within the automobile while maintaining the brake force.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide further understanding of the invention and are incorporated in and constitute a part of this specification, illustrate an embodiment of the invention and together with the description serve to explain the principles of the invention:

DETAILED DESCRIPTION OF PREFERRED EMBODIMENT

Figure 1:
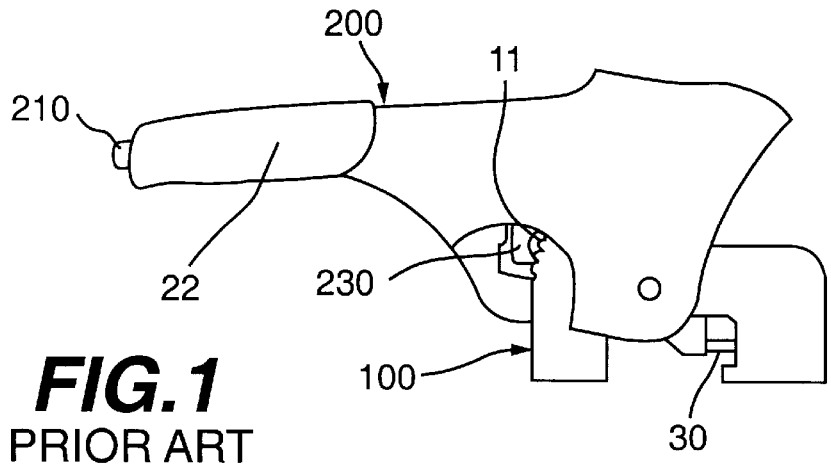
FIG. 1 is a view to explain a conventional automobile hand brake.
Figure 2:
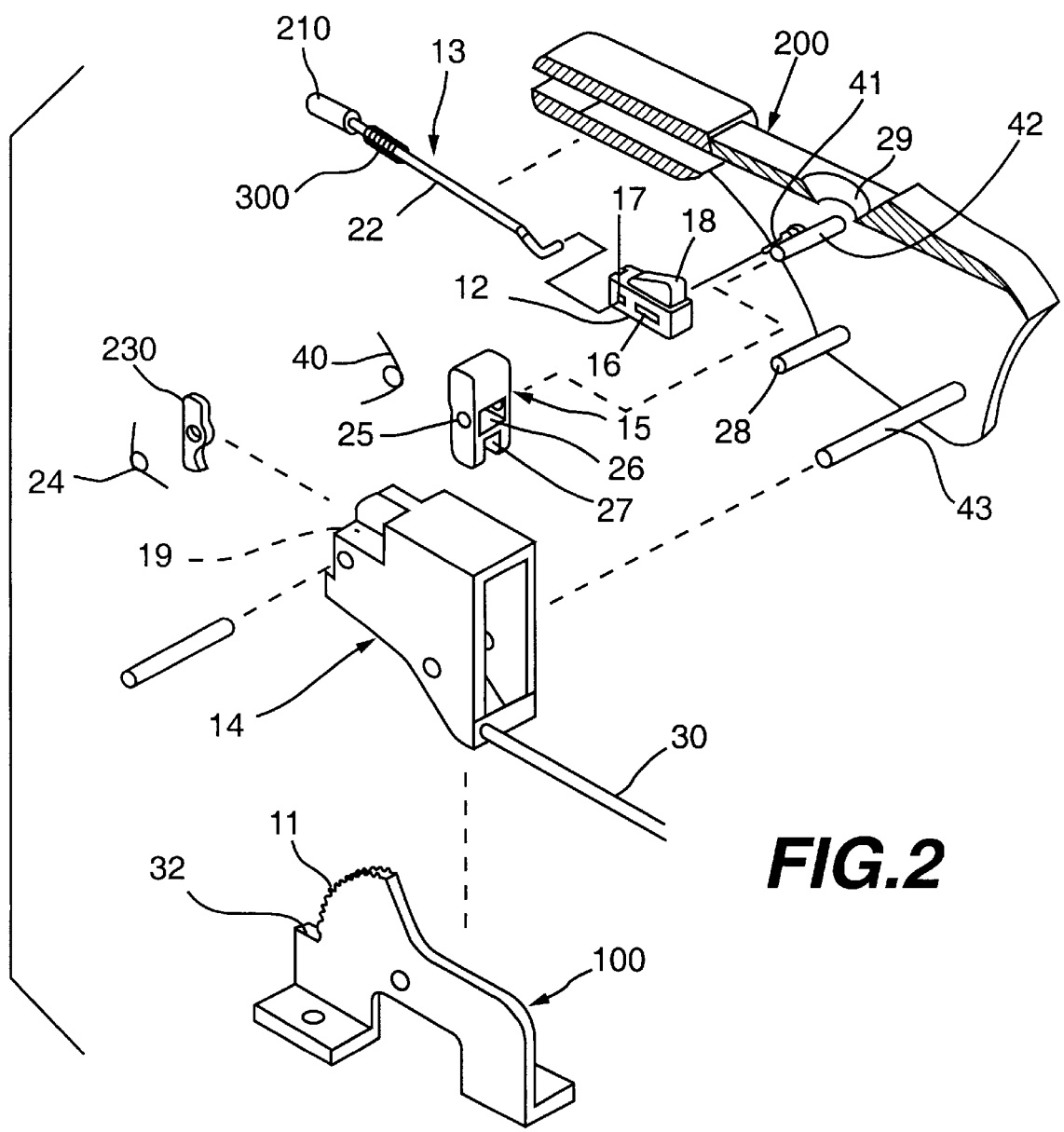
FIG. 2 is an exploded cross-sectional view of a hand brake of the preferred embodiment of the present invention.

Reference will now be made in detail to the preferred embodiment of the present invention, an example of which is illustrated in the accompanying drawings.

FIGS. 2 and 3a–3c are provided to explain a hand brake with a foldable operating lever in accordance with the preferred embodiment of the present invention.

Referring to FIGS. 2 and 3a–3c, the operation of the brake is accomplished via manipulation of an operating lever 200. The operating lever 200 includes a setting hole 29 formed on the upper portion of the operating lever 200. The operating lever also includes a slide hinge 41, upper limiter hinge 42, and a rotational hinge 43. The slide hinge 41 is used to couple with a slide member 12; the upper limiter hinge 42 is used to couple with upper limiter 15; and the rotational hinge 43 is used to couple with both a ratchet 100 and a rotational body 14.

The ratchet 100 is fixed onto a frame (not shown) of an automobile and is hingedly coupled to the operating lever 200 via the rotational hinge 43. A plurality of regularly spaced teeth 11 are formed on the ratchet 100. There is also a hanging projection 32 toward the front of the ratchet 100.

Within the hand brake, the rotational body 14 is hingedly coupled to both the operating lever 200 and the ratchet 100 via the rotational hinge 43. The rotational body 14 rotates on the same plane of rotation as the operating lever 200. The rotational body 14 is also set up in such a way that it is selectively locked or released in relation to any of the teeth 11 of the ratchet 100.

The rotational body 14 is of a square bloc type and has a thin-plated cross-section of a designated width. Also an impression 19 is formed on the front section. The top portion of the impression 19 is used to fit to an upper limiter 15 so as allow the rotational body 14 to rotate along with the operating lever 200 when the rotational body 14 and the upper limiter 15 are in contact with each other.

An operational member 13 is substantially disposed within the operating lever 200 and includes a releasing means, in this case a push button 210, a rod 22 and a spring support 300. The push button 210 partially protrudes from the front of the operating lever 200. The rod 22 is connected to the push button 210 at one end and is connected to a slide member 12 at the other end. The spring support 300 provides the necessary force such that the push button 210 is biased to be partially protruding from the operating lever 200. When the push button 210 is pushed, the operational member 13 and the slide member 12 move in a lengthwise direction of the operating lever 200.

The slide member 12 comprises of a slot 16, a joint hole 17 and an inclined surface 18. The slot 16 is of a designated length running along the center of a side of the slide member 12. The slot 16 is used to slidely couple the slide member 12 with the slide hinge 41 of the operating lever 200. This coupling allows the slide member 12 to slide within the hand brake in a lengthwise direction of the operating lever. The joint hole 17 couples with the rod 22 of the operational member 13. This coupling fixes the movement of the slide member 12 to the movement of the operational member 13. The inclined surface 18 is formed on top of the slide member 12 and is upwardly sloping.

A pawl 230 is hingedly coupled to the interior of the rotational body 14 and further includes an elastic support 24. The elastic support 24 provides a force such that the pawl 230 is biased to gear with any of the teeth 11 of the ratchet 100. When the slide member 12 and the pawl 230 are in line, pushing the push button 210 causes the slide member 12 to move and thereby forcibly rotating the pawl 230. This rotation disengages the pawl 230 from being in gear.

An upper limiter 15 is of a stick type of a designated size. It further includes a hinge hole 25, a spring hole 26, an elastic support 40, and an incision 27. The hinge hole 25 is used to hingedly couple with the upper limiter hinge 42 of the operating lever 200. The spring hole 26 is formed perpendicular to the hinge hole 25 and substantially houses the elastic support 40. The elastic support 40 provides a force such that the upper limiter 15 is biased to protrude through the setting hole 29 of the operating lever 200. The incision 27 is formed on the bottom side of the upper limiter 15 and fits the impression 19 of the rotational body 14. When the incision 27 is in contact with the impression 19, it allows the rotational body 14 to rotate along with the operating lever 200. However, the rotation of the rotational body 14 is limited by the upper limiter 15.

A lower limiter 28 at the lower portion of the operating lever 200, in combination with the hanging projection 32 of the ratchet 100, limits the downward rotation of the operating lever 200.

Figure 3A:
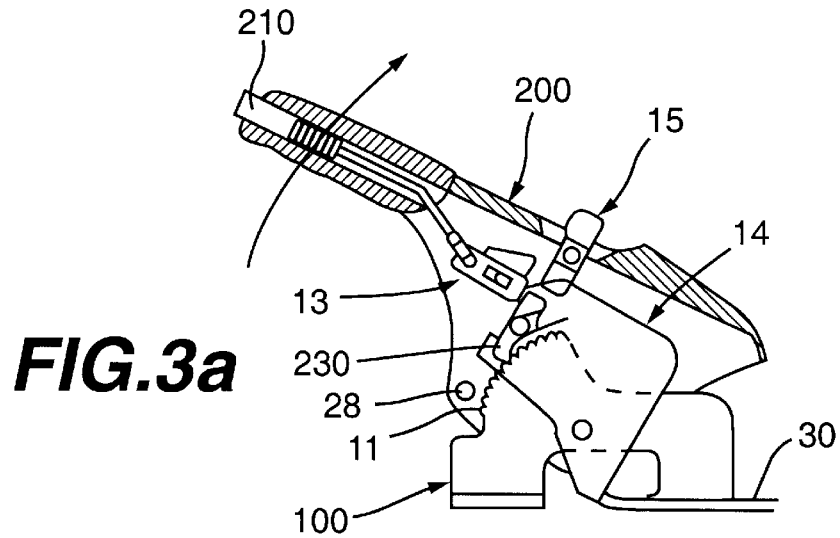
FIG. 3a is a cross-sectional view to explain a hand brake applying a braking force in accordance with an embodiment of the present invention.

The operation of the embodiment is as follows. FIG. 3a shows a situation where a braking force is applied. To apply the braking force, the operating lever 200 is pulled upwards. When this occurs, the pawl 230 becomes repetitively locked and released as it climbs upward along the teeth 11 formed on ratchet 100. The rotational body 14 is also pulled upwards in proportion to the movement of the operating lever 200.

Eventually, the upper limiter 15 comes in contact with the slide member 12. Due to the inclined surface 18 of the slide member 12, the upper limiter 15 is rotated out of the way of the rotational body 14. The result is that the rotational body 14 is separated from the operating lever 200. At this point, the pawl 230 is in gear with one of the teeth 11 of the ratchet 100, thus setting the braking force.

Figure 3B:
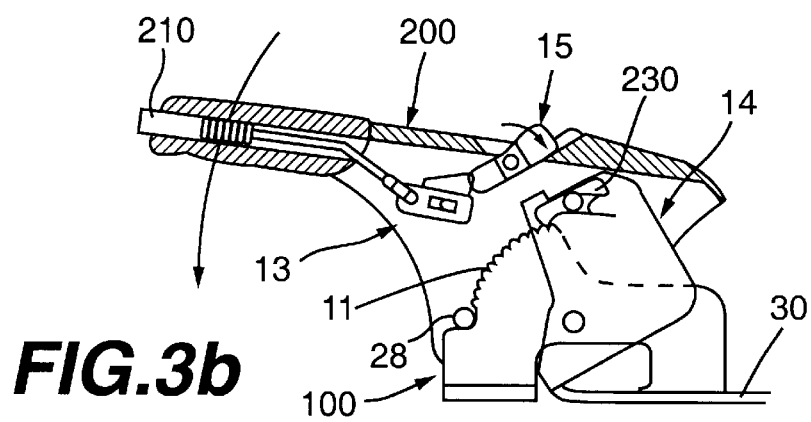
FIG. 3b is a cross-sectional view to explain a hand brake in a folded (lowered) position while maintaining the braking force in accordance with an embodiment of the present invention.

FIG. 3b shows a situation where the operating lever of the hand brake is pushed downwards and thus out of the way while the brake force is maintained. When the rotational body 14 becomes separated from the operating lever 200, the operating lever is then free to be pushed downwards. The pawl 230 and the rotational body 14 are locked in gear with one of the teeth 11 of the ratchet 100, thus maintaining braking force.

Figure 3C:
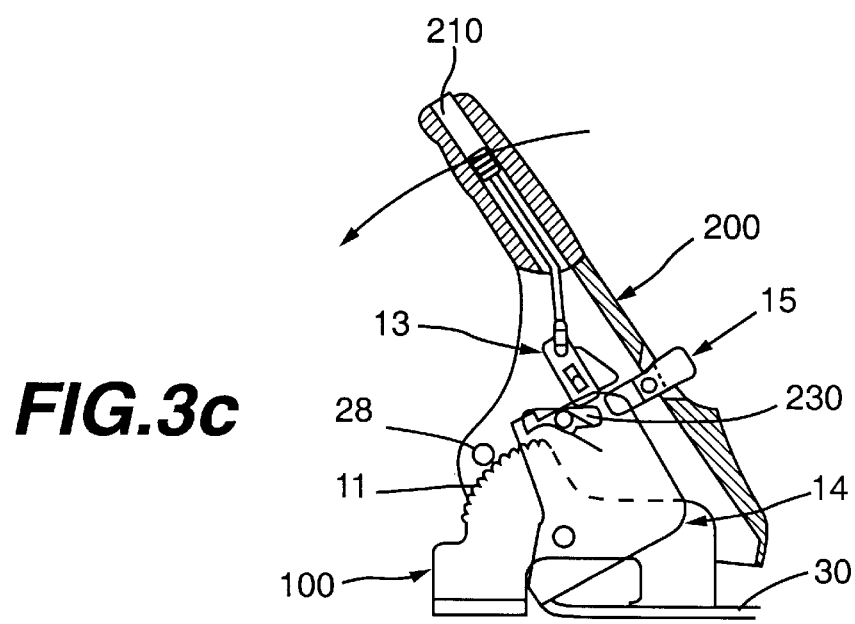
FIG. 3c is a cross-sectional view to explain a hand brake releasing the braking force in accordance with an embodiment of the present invention.

FIG. 3c shows a situation where the braking force is released. The operating lever 200 is again pulled upward such that it's in the same position as it was prior to being pushed down. After being pulled upwards, the upper limiter returns to its pre-braking position. Also at this point, the slide member 12 is in line with a portion of the pawl 230. At this juncture, the push button 210 can be pushed which forces the slide member 12 move backwards which in turn forcibly rotates the pawl 230 to disengage from the teeth 11 of the ratchet 100. The rotational body 14 and the operating lever 200 come in contact with each other and both are now rotated downwards to release the brake force from the automobile.

It will be apparent to those skilled in the art that various modifications and variations can be made in a hand brake with foldable operating lever of the present invention. Thus, it is intended that the present invention cover the modifications and variations of this invention. lever.

What is claimed is:

1. A hand brake, comprising:

an operating lever;

a ratchet hingedly coupled to said operating lever;

a plurality of teeth regularly formed on said ratchet;

a rotational body hingedly coupled to said operating lever and to said ratchet, wherein said rotational body rotates along the same plane of rotation as said operating lever and allows said operating lever to be selectively locked and released from said ratchet;

an operational member substantially disposed within said operating lever;

a slide member coupled to an end portion of said operational member;

a pawl hingedly coupled to said rotational body, said pawl being biased to be in gear with any of said teeth of said ratchet; and an upper limiter hingedly coupled to said operating lever, whereby said upper limiter limits the upward rotation of said rotational body.

2. A hand brake as in claim 1, wherein said operational member further includes:

a releasing means biased to be partially protruding from said operating lever; and a rod with a first end connected to said releasing means and a second end connected to said slide member.

3. A hand brake as in claim 1, wherein said slide member includes:

a slot of designated length on one side of said slide member, said slot being slidely coupled to a fixed hinge of said operating lever;

a joint hole used to couple said slide member with said operational member; and an inclined surface on the top thereof.

4. A hand brake as in claim 1, wherein said rotational body further includes:

a cross section of a designated width; and an impression on a front section which mates with said upper limiter when said rotational body and said upper limiter come in contact with each other.

5. A hand brake as in claim 1, wherein said pawl is hingedly coupled to the interior of said rotational body and is biased to gear with any of said teeth of said ratchet.

6. A hand brake as in claim 1, wherein said upper limiter is hingedly coupled to said operating lever, and is biased to limit the upward rotation of said rotational body.

7. A hand brake as in claim 1, wherein said ratchet further includes a lower limiter to limit the downward rotation of said operating lever.

8. A hand brake as in claim 1, wherein said operating lever further includes an aperture on the upper side thereof which allows the upper limiter to protrude therefrom.

* * * * *